US012031690B2

(12) United States Patent
Wu

(10) Patent No.: US 12,031,690 B2
(45) Date of Patent: Jul. 9, 2024

(54) FLAME SIMULATION DEVICE

(71) Applicant: AE TECHNOLOGIES CO., LTD., Guangdong (CN)

(72) Inventor: Wenfeng Wu, Guangdong (CN)

(73) Assignee: AE TECHNOLOGIES CO., LTD., Guangzhou (CN)

( * ) Notice: Subject to any disclaimer, the term of this patent is extended or adjusted under 35 U.S.C. 154(b) by 0 days.

(21) Appl. No.: 17/948,294

(22) Filed: Sep. 20, 2022

(65) Prior Publication Data

US 2024/0035634 A1 Feb. 1, 2024

(30) Foreign Application Priority Data

Jul. 29, 2022 (CN) ......................... 202210904444.2

(51) Int. Cl.
*F21S 10/00* (2006.01)
*F21S 10/04* (2006.01)

(52) U.S. Cl.
CPC ............. *F21S 10/002* (2013.01); *F21S 10/04* (2013.01)

(58) Field of Classification Search
CPC ........ F21S 10/04; F21S 10/043; F21S 10/046; F21S 6/001
See application file for complete search history.

(56) References Cited

U.S. PATENT DOCUMENTS

| | | | | |
|---|---|---|---|---|
| 5,909,954 A * | 6/1999 | Thomas | F21V 1/00 | 362/313 |
| 6,312,137 B1 * | 11/2001 | Hsieh | B25B 33/00 | 362/294 |
| 6,454,425 B1 | 9/2002 | Lin | | |
| 6,461,011 B1 * | 10/2002 | Harrison | F24C 7/004 | 40/428 |
| 11,092,302 B2 * | 8/2021 | Wu | F21S 6/001 | |
| 2002/0080601 A1 * | 6/2002 | Meltzer | F24C 7/004 | 362/811 |
| 2003/0053305 A1 * | 3/2003 | Lin | F21V 29/60 | 362/208 |
| 2004/0165374 A1 * | 8/2004 | Robinson | F21S 10/046 | 362/96 |

(Continued)

FOREIGN PATENT DOCUMENTS

| | | |
|---|---|---|
| CN | 1463346 A | 12/2003 |
| CN | 103574487 A | 2/2014 |

(Continued)

*Primary Examiner* — Alexander K Garlen

(57) ABSTRACT

The present disclosure relates to the technical field of a flame simulation equipment, and provides a flame simulation device. The flame simulation device includes: a housing with an accommodating chamber, a flowable predetermined substance filled in the accommodating chamber, a rack provided in the accommodating chamber, a conveying channel provided in the accommodating chamber for flow of the preset substance, a pump provided in the accommodating chamber and configured to drive the predetermined substance to flow along the conveying channel, a flexible sheet provided on the rack and located on an ejection path of an outlet of the conveying channel, and a light source assembly provided in the accommodating chamber and configured to project a preset light beam upon the flexible sheet.

20 Claims, 13 Drawing Sheets

(56) References Cited

U.S. PATENT DOCUMENTS

| | | | | |
|---|---|---|---|---|
| 2008/0112154 | A1* | 5/2008 | Reichow | F24C 7/004 362/96 |
| 2017/0108188 | A1 | 4/2017 | Lai | |
| 2019/0195447 | A1* | 6/2019 | Wu | B05B 1/14 |
| 2022/0178508 | A1* | 6/2022 | Biasotti | F21S 10/046 |

FOREIGN PATENT DOCUMENTS

| | | | | |
|---|---|---|---|---|
| CN | 106642006 | A | 5/2017 | |
| CN | 206555927 | U | * 10/2017 | F21S 10/04 |
| CN | 206875337 | U | 1/2018 | |
| CN | 211551749 | U | 9/2020 | |

* cited by examiner

FLAME SIMULATION DEVICE

CROSS REFERENCE TO RELATED APPLICATIONS

The present application claims the benefit of Chinese Patent Application No. 202210904444.2 filed on Jul. 29, 2022, the contents of which are incorporated herein by reference in their entirety.

TECHNICAL FIELD

The present disclosure belongs to the technical field of flame simulation equipment, and in particular relates to a flame simulation device.

BACKGROUND

In modern life, candles are usually used to set the atmosphere. However, the burning process of candles is dangerous and pollutes the environment. The existing simulated flames are usually demonstrated by using a piece of paper as a flame head, which is not vivid.

SUMMARY

An objective of the present disclosure is to provide a flame simulation device to solve the technical problem that the existing simulated flame is not vivid.

In order to achieve the above objective, the present disclosure adopts the following technical solution: a flame simulation device, including a housing with an accommodating chamber, a flowable predetermined substance filled in the accommodating chamber, a rack provided in the accommodating chamber, a conveying channel provided in the accommodating chamber for flow of the predetermined substance, a pump provided in the accommodating chamber and configured to drive the predetermined substance to flow along the conveying channel, a flexible sheet provided on the rack and located on an ejection path of an outlet of the conveying channel, and a light source assembly provided in the accommodating chamber and configured to project a preset light beam upon the flexible sheet.

Further, there is at least one flexible sheet.

Further, the flexible sheet is any one of a reflective film, a silicone sheet and a plastic sheet.

Further, the housing is made of a transparent material or a semi-transparent material.

Further, the predetermined substance is a liquid.

Further, the predetermined substance is a gas.

Further, the rack is provided with an ejection port that communicates with the outlet of the conveying channel; and the flexible sheet is located on an ejection path of the ejection port.

Further, the light source assembly includes: a light body connected to the housing and illuminating the flexible sheet.

Further, the light source assembly further includes: a lens, which focuses the light beam emitted by the light body on the flexible sheet.

Further, the light body projects the light beam upon the flexible sheet from bottom to top or from top to bottom.

Further, a reflective cup is provided above the flexible sheet.

Compared with the prior art, the flame simulation device provided by the present disclosure has the following beneficial effects. The housing is provided with the accommodating chamber, the accommodating chamber is filled with the flowable predetermined substance, and the predetermined substance is flowable in the accommodating chamber. The rack is provided in the accommodating chamber, the flexible sheet is provided on the rack, and the flexible sheet is immersed in the predetermined substance. The conveying channel for conveying the predetermined substance is provided in the accommodating chamber, and the pump drives the predetermined substance to be conveyed along the conveying channel. That is, under the driving of the pump, the predetermined substance in the accommodating chamber enters the conveying channel from an inlet of the conveying channel, and the predetermined substance in the conveying channel is ejected into the accommodating chamber from the outlet of the conveying channel to form a circulation. The flexible sheet is located on the ejection path of the outlet of the conveying channel, such that the predetermined substance in the conveying channel is ejected to the flexible sheet from the outlet of the conveying channel. The flexible sheet swings under the impact of the predetermined substance. The light source assembly projects the preset light beam upon the flexible sheet. With the preset light beam on the flexible sheet, the swinging flexible sheet is like a flame, which is true to life.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description merely show some embodiments of the present disclosure, and persons of ordinary skill in the art may still derive other drawings from these accompanying drawings without creative efforts.

REFERENCE NUMERALS

1. housing; 11. accommodating chamber; 111. upper chamber; 112. lower chamber; 12. upper housing body; 13. lower housing body; 2. rack; 21. ejection port; 22. water inlet; 31. conveying channel; 32. pump; 41. flexible sheet; 42. wick part; 5. light source assembly; 51. light body; 52. lens; 53. bracket; 531. plate; 5311. through hole; 532. inclined beam; 533. positioning rod; 534. reinforcing rib; 6. reflective cup; 71. controller; 72. power source; 73. charging stand; 74. bottom cover; and 75. top cover.

DETAILED DESCRIPTION

To make the to-be-resolved technical problems, the technical solutions, and the beneficial effects of the present disclosure clearer, the present disclosure is described in further detail below with reference to the accompanying drawings and embodiments. Understandably, the specific embodiments described herein are merely intended to explain the present disclosure but not to limit the present disclosure.

It should be noted that when a component is "fixed" or "provided" on the other component, the component may be "fixed" or "provided" on the other component directly or indirectly. When a component is "connected" to the other component, the component may be "connected" to the other component directly or indirectly.

It should be noted that, in the description of the embodiments of the present application, unless otherwise specified, "I" means "or", for example, "A/B" may mean "A or B". The term "and/or" herein merely describes associations between associated objects, and it indicates three types of relationships. For example, "A and/or B" may indicate A alone, A and B, or B alone. "A" and "B" may be singular or plural, respectively.

It should be understood that in the description of the present disclosure, terms such as "length", "width" "upper", "lower", "front", "rear", "left", "right", "vertical", "horizontal", "top", "bottom", "inside" and "outside" indicate the orientation or position relationships based on the drawings. They are merely intended to facilitate or simplify description of the embodiments of the present disclosure, rather than to indicate or imply that the mentioned apparatus or component must have a specific orientation and must be constructed and operated in a specific orientation. Therefore, these terms should not be construed as a limitation to the present disclosure.

Moreover, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, "multiple" means two or more, unless otherwise specifically defined.

Figure 1:
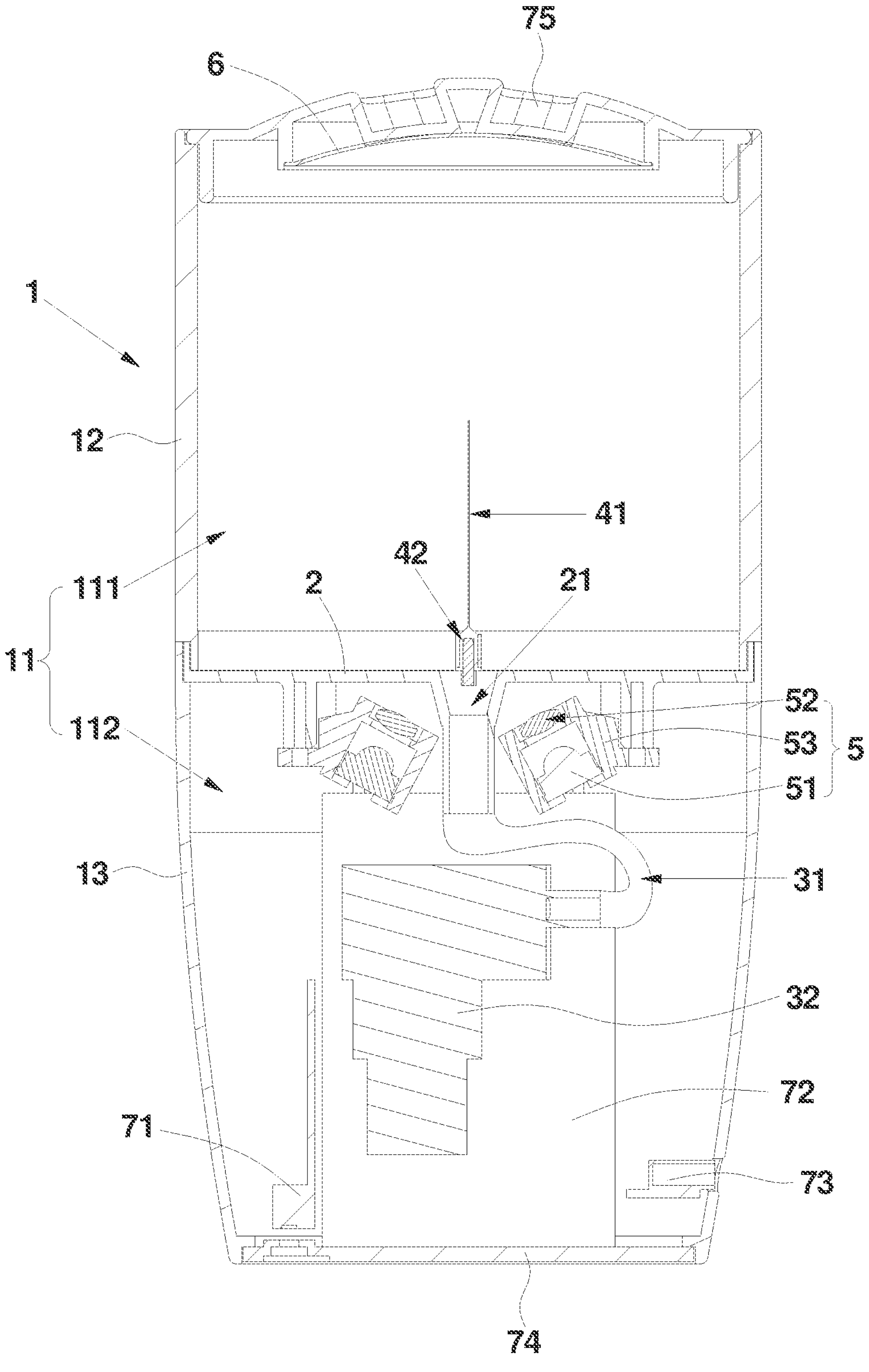
FIG. 1 is a first section view of a flame simulation device according to an embodiment of the present disclosure.
Figure 2:
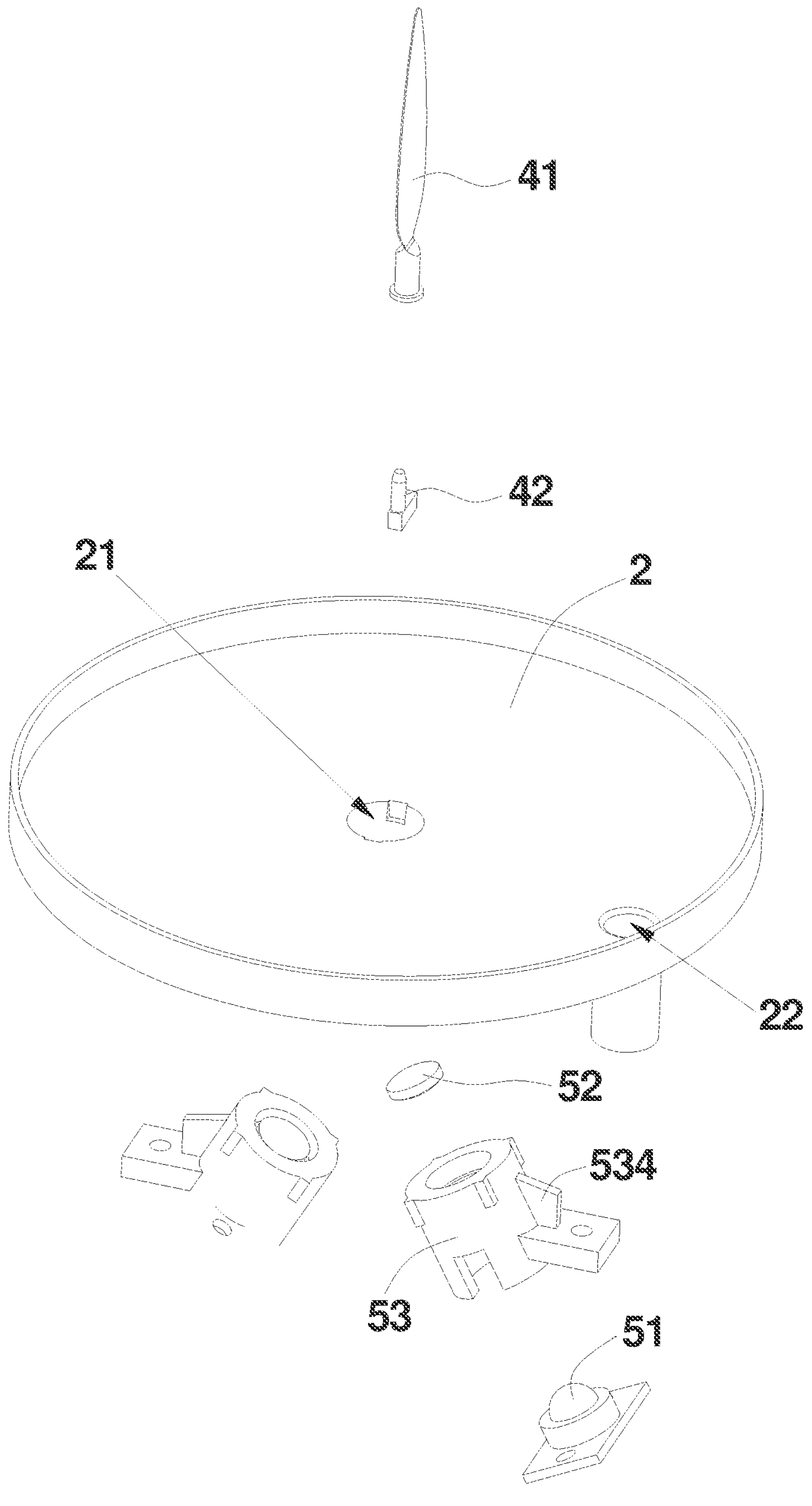
FIG. 2 is a first three-dimensional installation diagram of the light body according to an embodiment of the present disclosure.
Figure 3:
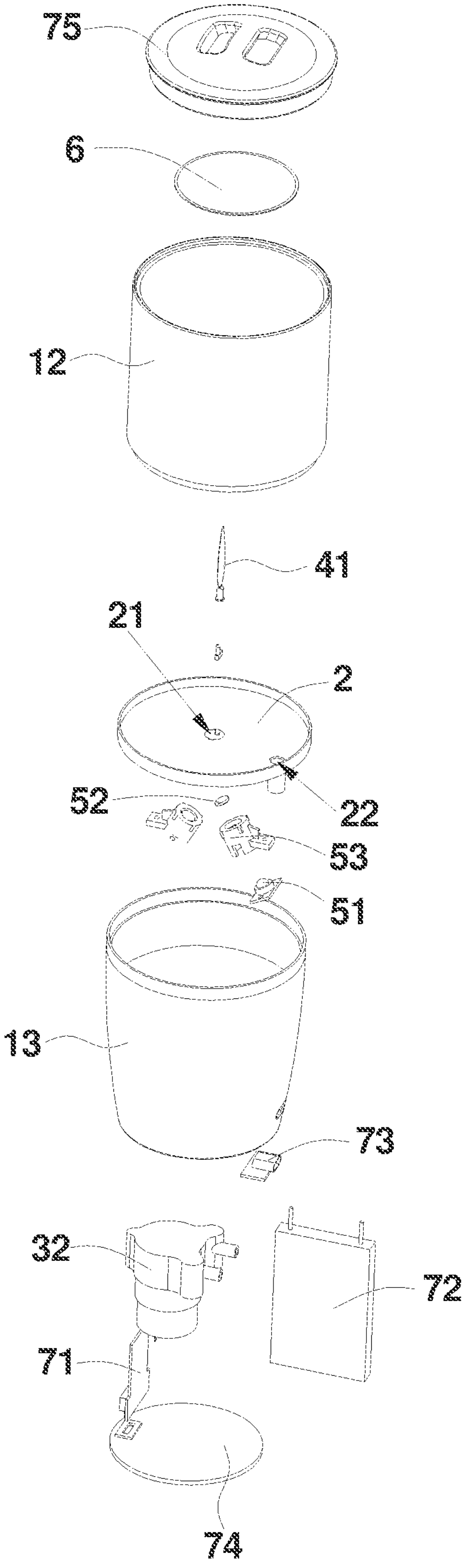
FIG. 3 is a first exploded view of the flame simulation device according to an embodiment of the present disclosure.
Figure 4:
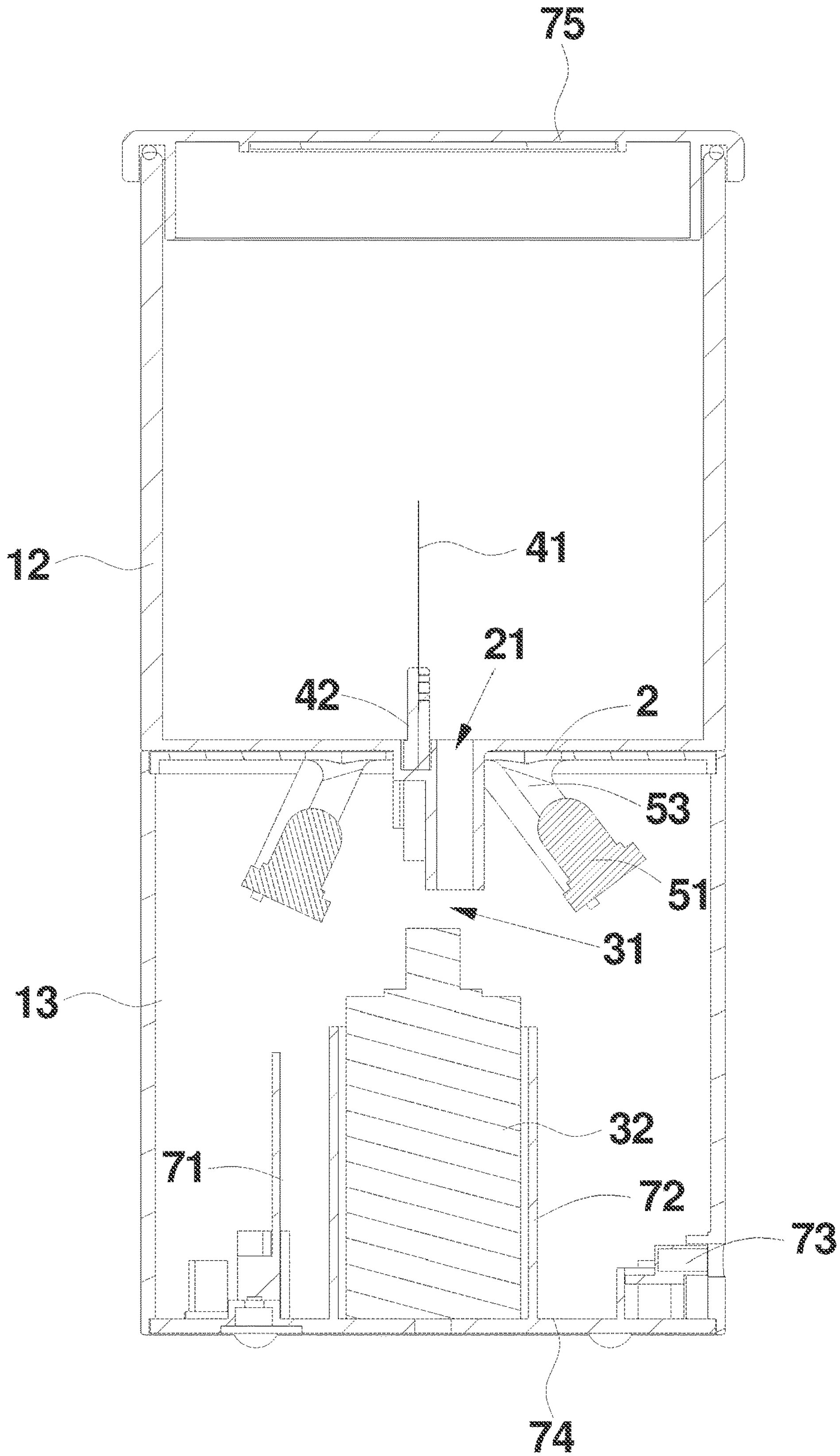
FIG. 4 is a second section view of the flame simulation device according to the present disclosure.
Figure 5:
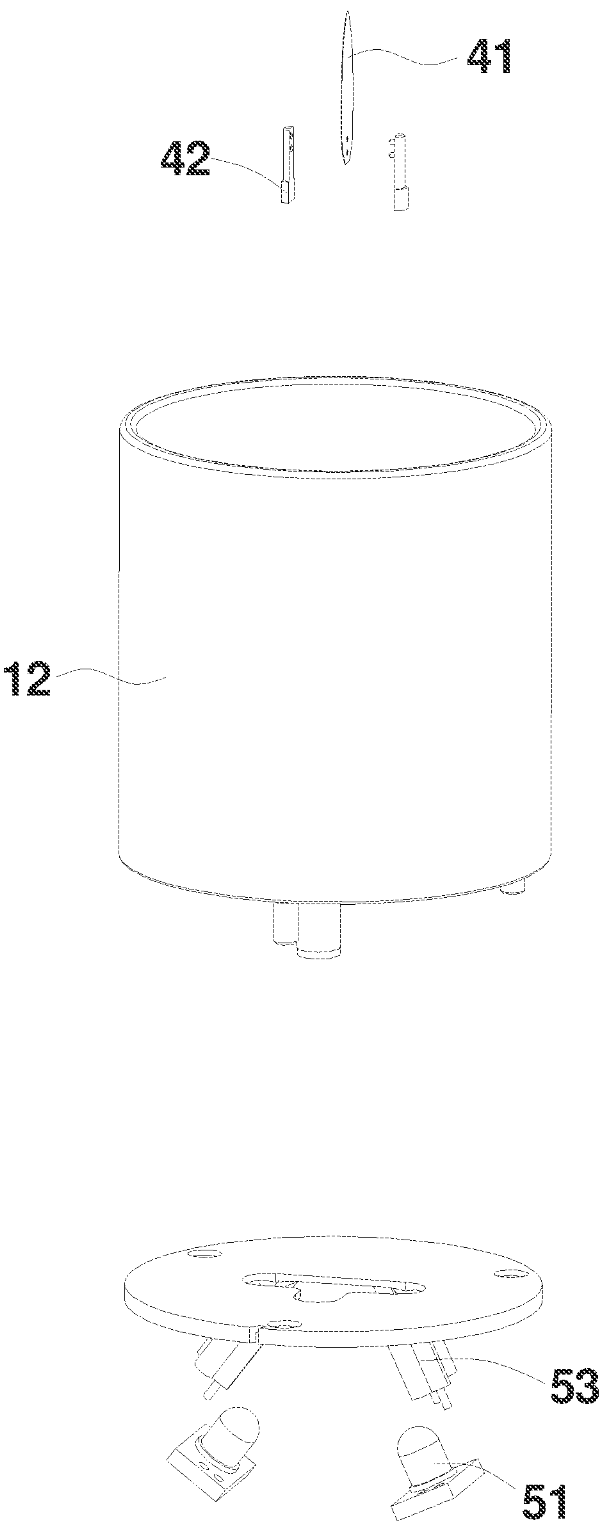
FIG. 5 is a second three-dimensional installation diagram of the light body according to an embodiment of the present disclosure.

The present disclosure provides a flame simulation device. Referring to FIGS. 1 to 3, the flame simulation device includes: a housing 1 with an accommodating chamber 11, a flowable predetermined substance filled in the accommodating chamber 11, a rack 2 provided in the accommodating chamber 11, a conveying channel 31 provided in the accommodating chamber 11 for flow of the predetermined substance, a pump 32 provided in the accommodating chamber 11 and configured to drive the predetermined substance to flow along the conveying channel 31, a flexible sheet 41 provided on the rack 2 and located on an ejection path of an outlet of the conveying channel 31, and light source assemblies 5 provided in the accommodating chamber 11 and configured to project a preset light beam upon the flexible sheet 41.

Overall, the housing 1 is provided with the accommodating chamber 11, the accommodating chamber 11 is filled with the flowable predetermined substance, and the predetermined substance is capable of flowing in the accommodating chamber 11. The rack 2 is provided in the accommodating chamber 11, the flexible sheet 41 is provided on the rack 2, and the flexible sheet 41 is immersed in the predetermined substance. The conveying channel 31 for conveying the predetermined substance is provided in the accommodating chamber 11, and the pump 32 drives the predetermined substance to be conveyed along the conveying channel 31. That is, under the driving of the pump 32, the predetermined substance in the accommodating chamber 11 enters the conveying channel 31 from an inlet of the conveying channel 31, and the predetermined substance in the conveying channel 31 is ejected into the accommodating chamber 11 from the outlet of the conveying channel 31 to form a circulation. The flexible sheet 41 is located on the ejection path of the outlet of the conveying channel 31, such that the predetermined substance in the conveying channel 31 is ejected to the flexible sheet 41 from the outlet of the conveying channel 31. The flexible sheet 41 swings under the impact of the predetermined substance. The light source assembly 5 projects the preset light beam upon the flexible sheet 41. With the preset light beam on the flexible sheet 41, the swinging flexible sheet 41 is like a flame, which is true to life.

In an embodiment, the "like a flame" means that the swinging flexible sheet 41 combined with the preset illumination beam on the flexible sheet 41 generates a flame-like effect. In an embodiment, the flame may have a color of any visible light, such as red or blue.

In an embodiment, the conveying channel 31 is a space for conveying the predetermined substance.

In an embodiment, the conveying channel 31 is a tubular body.

In an embodiment, the predetermined substance may be a liquid or a gas. In an embodiment, the predetermined substance is a liquid or a gas at normal temperature (between 5° C. and 50° C.).

In an embodiment, the preset light beam is red light.

In an embodiment, the rack 2 is a separator, which divides the accommodating chamber 11 into an upper chamber 111 and a lower chamber 112.

In an embodiment, the flexible sheet 41 is located in the upper chamber 111.

In an embodiment, the pump 32 is located in the lower chamber 112.

In an embodiment, an ejection port 21 is provided on the separator, and the ejection port 21 communicates the upper chamber 111 with the lower chamber 112.

In an embodiment, a water inlet 22 is provided on the separator, and the water inlet 22 communicates the upper chamber 111 with the lower chamber 112.

In an embodiment, the ejection port 21 and the water inlet 22 are spaced apart.

In an embodiment, the separator is a transparent partition, and the preset light beam passes through the partition from below to illuminate the flexible sheet 41 (i.e. the partition separates the flexible sheet 41 and the light source assembly 5 in the up-and-down direction). The preset light beam projected from bottom to top is easily reflected by the flexible sheet 41 and then transmitted obliquely upward to an outside of the housing 1, which is convenient for a user to observe. Part of the preset light beam projected upward may also be reflected back to the flexible sheet 41 by a reflective cup 6 positioned above the flexible sheet 41, thereby illuminating the flexible sheet 41 from top to bottom. The flexible sheet 41 and the light source assembly 5 are separated by the partition, such that the interference of the predetermined substance ejected to the flexible sheet 41 on the light source assembly 5 can be reduced. The design avoids the instability of the preset light beam caused by shaking of the light source assembly 5, and also avoids loosening of a light body 51 or a lens 52 of the light source assembly 5.

In an embodiment, multiple light source assemblies 5 are provided to surround an outside of the ejection port 21.

In an embodiment, a side wall of the ejection port 21 is provided with a slot. The flexible sheet 41 is connected to a wick part 42, and the wick part 42 is clamped in the slot of the ejection port 21. In this way, the flexible sheet 41 can be mounted very conveniently.

In an embodiment, the housing 1 includes: an upper container body 12 and a lower container body 13 connected to the upper container body 12. A bottom of the lower container body 13 is covered and sealed by a bottom cover 74. The upper container body 12 and the lower container body 13 are sealed respectively, and the upper container body 12 and the lower container body 13 are separated by the rack 2. In an embodiment, a space in the upper container body 12 defines the upper chamber 111, and a space in the lower container body 13 defines the lower chamber 112.

In an embodiment, a top of the upper container body 12 is sealed by a top cover 75.

In an embodiment, the rack 2 and the upper container body 12 are integrally formed.

Figure 12:
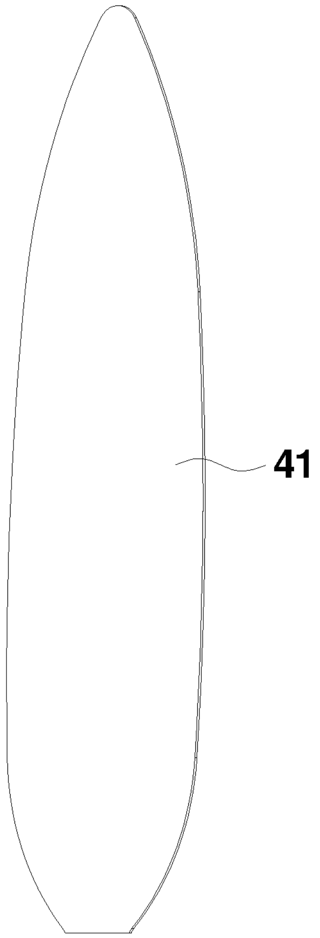
FIG. 12 is a first view of the flexible sheet in a flat state according to an embodiment of the present disclosure.
Figure 13:
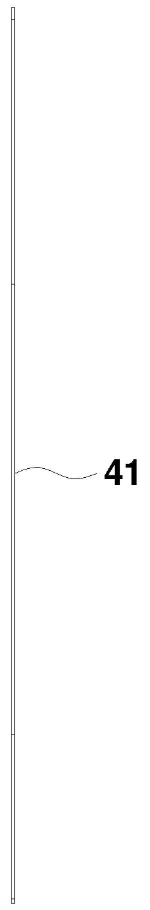
FIG. 13 is a second view of the flexible sheet in a flat state according to an embodiment of the present disclosure.

Referring to FIGS. 12 and 13, in an embodiment, before the predetermined substance is ejected to the flexible sheet 41, the flexible sheet 41 is in a flat state.

Figure 10:
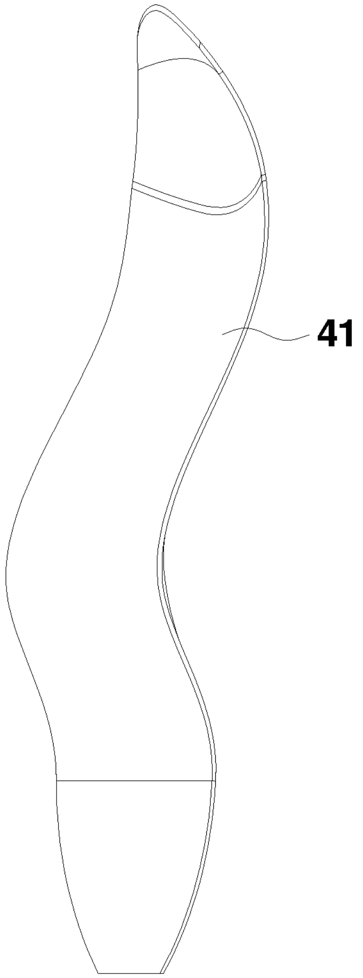
FIG. 10 is a first view of a flexible sheet in a twisted state according to an embodiment of the present disclosure.
Figure 11:
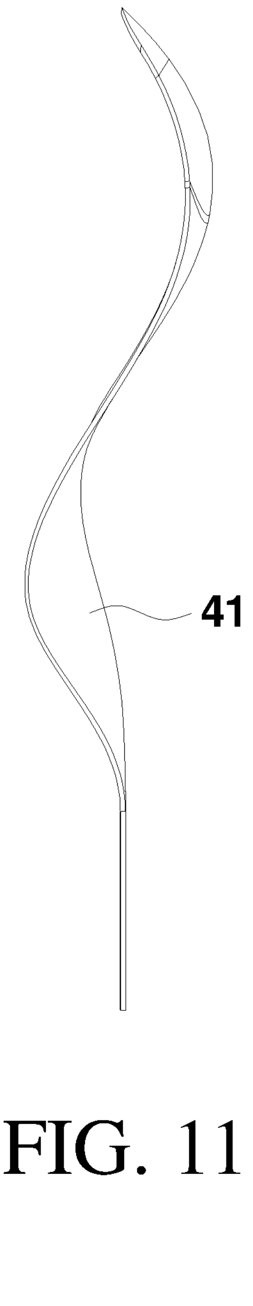
FIG. 11 is a second view of the flexible sheet in a twisted state according to an embodiment of the present disclosure.

Referring to FIGS. 10 and 11, in an embodiment, after the predetermined substance is ejected to the flexible sheet 41, the flexible sheet 41 is in a twisted state.

Further, referring to FIGS. 1 to 3, as a specific implementation of the flame simulation device provided by the present disclosure, at least one flexible sheet 41 may be provided. In case multiple flexible sheets 41 are provided, they swing simultaneously to exhibit multiple flames.

Further, referring to FIGS. 1 to 3, as a specific implementation of the flame simulation device provided by the present disclosure, the flexible sheet 41 is any one of a reflective film, a silicone sheet and a plastic sheet, which has desired flexibility and is easy to reflect or transmit light.

In an embodiment, the flexible sheet 41 is a reflective film, or a reflective layer is provided on the flexible sheet 41. In this way, the preset light beam projected upon the flexible sheet 41 can be reflected by the flexible sheet 41, which facilitates the user to observe the flexible sheet 41.

In an embodiment, the flexible sheet 41 is a metal film.

In an embodiment, a surface of the flexible sheet 41 is covered with a metal film layer.

Further, referring to FIGS. 1 to 3, as a specific implementation of the flame simulation device provided by the present disclosure, the housing 1 is made of a transparent material or a semi-transparent material. In this way, it is convenient for the user to observe the flexible sheet 41 through the housing 1.

Further, referring to FIGS. 1 to 3, as a specific implementation of the flame simulation device provided by the present disclosure, the preset substance is a liquid, which makes the flexible sheet 41 easily float in the liquid.

In an embodiment, the pump 32 is a water pump.

Further, referring to FIGS. 1 to 3, as a specific implementation of the flame simulation device provided by the present disclosure, the predetermined substance is a gas, which is easily filled in the accommodating chamber 11.

In an embodiment, the gas is air.

In an embodiment, the pump 32 is an air pump.

Further, referring to FIGS. 1 to 3, as a specific implementation of the flame simulation device provided by the present disclosure, the rack 2 is provided with an ejection port 21. The ejection port 21 communicates with the outlet of the conveying channel 31. The flexible sheet 41 is located on an ejection path of the ejection port 21. In this way, the predetermined substance in the conveying channel 31 is conveyed to and ejected from the ejection port 21. Since the flexible sheet 41 is located on the ejection path of the ejection port 21, the predetermined substance ejected from the ejection port 21 can be directly targeted to the flexible sheet 41.

Further, referring to FIGS. 1 to 3, as a specific implementation of the flame simulation device provided by the present disclosure, the light source assembly 5 includes: a light body 51 connected to the housing 1 and illuminating the flexible sheet 41. The light body 51 emits the light beam to illuminate the flexible sheet 41, and the flexible sheet 41 reflects the light beam to form a flame-like effect.

Further, referring to FIGS. 1 to 3, as a specific implementation of the flame simulation device provided by the present disclosure, the light body 51 emits the light beam to the flexible sheet 41 from bottom to top. Alternatively, the light body 51 emits the light beam to the flexible sheet 41 from top to bottom.

Further, referring to FIGS. 1 to 3, as a specific implementation of the flame simulation device provided by the present disclosure, the light source assembly further includes: a lens 52. The lens 52 focuses the light beam emitted by the light body 51 on the flexible sheet 41. In this way, the light beam emitted by the light body 51 is focused on the flexible sheet 41.

In an embodiment, the light source assembly 5 includes: a bracket 53 provided on the rack 2 and a light body 51 provided on the bracket 53 and illuminating the flexible sheet 41. The light body 51 emits the light beam to illuminate the flexible sheet 41, and the flexible sheet 41 reflects the light beam to form a flame-like effect.

Further, referring to FIGS. 1 to 3, as a specific implementation of the flame simulation device provided by the present disclosure, the light body 51 is located below the rack 2, or the light body 51 is located above the rack 2. If the light body 51 is provided below the rack 2 as required, a space can be made above the rack to accommodate other structure. If the light body 51 is provided above the rack 2 as required, a space can be made below the rack to accommodate other structure.

Referring to FIGS. 4 to 8, the light body 51 is located below the rack 2.

Figure 9:
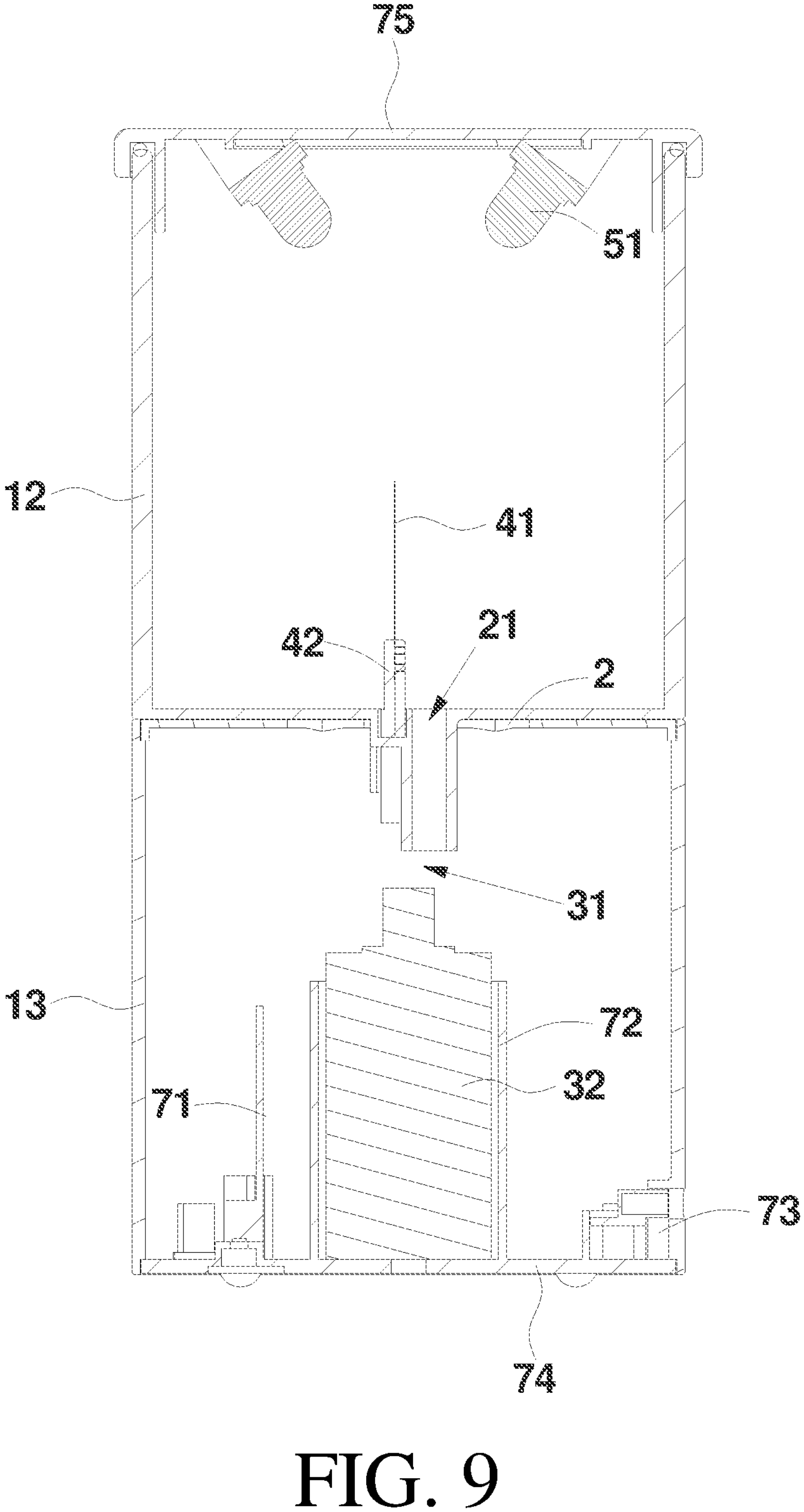
FIG. 9 is a third section view of the flame simulation device according to the present disclosure.

Referring to FIG. 9, the light body 51 is located above the rack 2.

Figure 6:
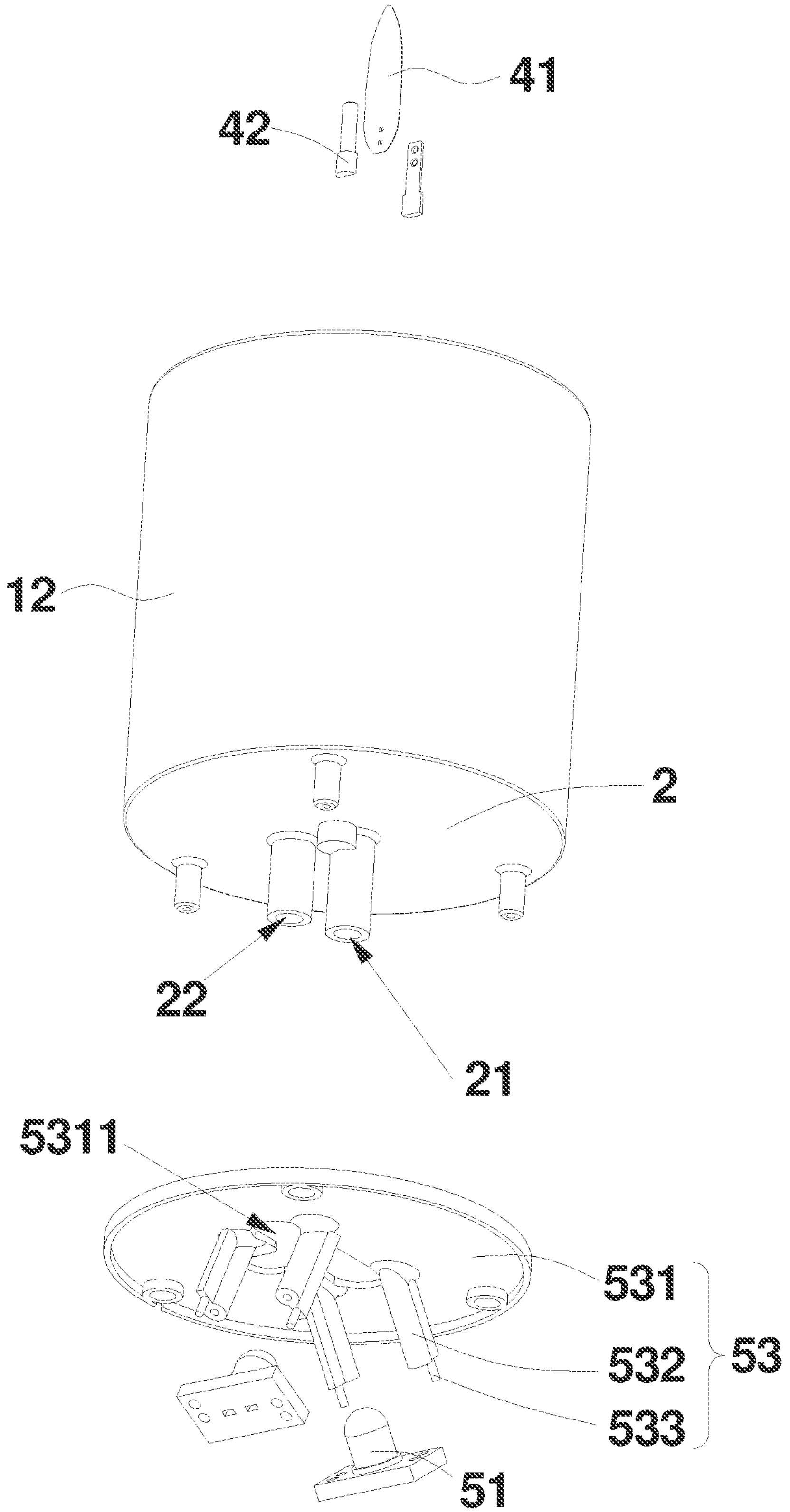
FIG. 6 is a third three-dimensional installation diagram of the light body according to an embodiment of the present disclosure.
Figure 7:
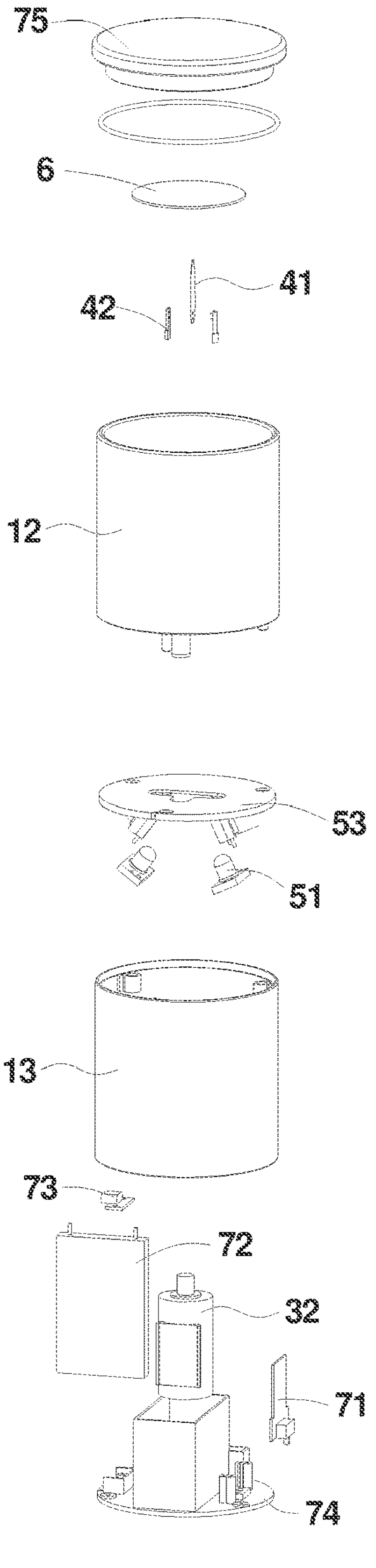
FIG. 7 is a second exploded view of the flame simulation device according to an embodiment of the present disclosure.
Figure 8:
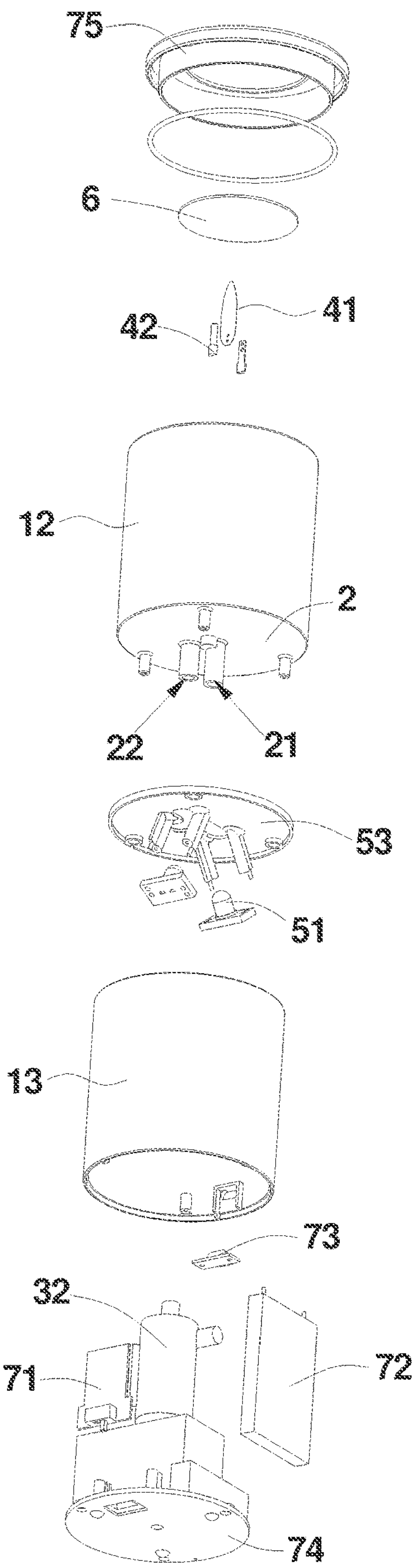
FIG. 8 is a third exploded view of the flame simulation device according to an embodiment of the present disclosure.

Referring to FIG. 6, the bracket 53 includes a plate 531, and two inclined beams 532 provided on the plate 531 and inclined relative to the plate 531. The light body 51 has one end detachably fixed to one inclined beam 532 and the other end detachably fixed to the other inclined beam 532. The light body 51 is sandwiched between the two inclined beams 532. In this way, the mounting of the light body 51 is very convenient, and the light body 51 is fixed very stably. In an embodiment, the inclined beam 532 is provided with a positioning rod 533. The light body 51 is provided with a positioning hole, and the positioning rod 533 is inserted into the positioning hole. In an embodiment, the inclined beams 532 and the positioning rods 533 extend toward an illumination direction of the light body 51 to reduce the obstructing effect on the light body 51 by the inclined beams 532 and the positioning rods 533. In an embodiment, the plate 531 is provided with a through hole 5311 for the light beam of the light body 51 to pass through. In an embodiment, the through hole 5311 is a slot hole, the light beam emitted by one light body 51 passes through one end of the slot hole, and the light beam emitted by another light body 51 passes through the other end of the slot hole. In an embodiment, a central region of the slot hole is concave outward to form a notch.

In an embodiment, there are multiple light bodies 51.

In an embodiment, referring to FIGS. 1 to 3, the light source assembly 5 includes: a light body 51 provided on the rack 2 and a lens 52 provided between the light body 51 and the flexible sheet 41 and focusing the light beam emitted by the light body 51 on the flexible sheet 41. In this way, the light beam emitted by the light body 51 passes through the lens 52 and is focused on the flexible sheet 41 to illuminate the flexible sheet 41.

In an embodiment, the light source assembly further includes: a bracket 53. The bracket 53 is provided with light-passing holes, and the lens 52 and the light body 51 are respectively clamped in the light-passing holes.

In an embodiment, the bracket 53 is fixed to the rack 2 through a mounting plate. A plate-shaped reinforcing rib 534 is provided between the bracket 53 and the mounting plate. The reinforcing rib 534 protrudes away from a junction of the bracket 53 and the mounting plate. The reinforcing rib 534 enhances the connection strength of the bracket 53 and the mounting plate, and the protruding reinforcing rib 534 releases the stress at the junction of the bracket 53 and the mounting plate towards a direction away from the junction of the bracket 53 and the mounting plate.

In an embodiment, the light body 51 is connected to a power source 72 through a wire.

In an embodiment, the lighting of the light body 51 is controlled by a controller 71. In an embodiment, the controller 71 is a printed circuit board (PCB).

In an embodiment, the power source 72 is a lithium battery.

In an embodiment, there are multiple light source assemblies 5.

In an embodiment, the power source 72 is charged through a charging stand 73.

Further, referring to FIGS. 1 to 3, as a specific implementation of the flame simulation device provided by the present disclosure, the light body 51 is a light-emitting diode (LED) bulb, which saves energy.

Further, referring to FIGS. 1 to 3, as a specific implementation of the flame simulation device provided by the present disclosure, a reflective cup 6 is provided above the flexible sheet 41. In this way, part of the light beam projected upon the flexible sheet 41 is reflected by the reflective cup 6 to the flexible sheet 41.

The above are only preferred implementations of the present disclosure. It should be noted that several improvements and replacements may further be made by a person of ordinary skill in the art without departing from the principle of the present disclosure, and such improvements and replacements should also be deemed as falling within the protection scope of the present disclosure.

The invention claimed is:

1. A flame simulation device, comprising: a housing with an accommodating chamber, a flowable predetermined substance filled in the accommodating chamber, a rack provided in the accommodating chamber, a conveying channel provided in the accommodating chamber for flow of the predetermined substance, a pump provided in the accommodating chamber and configured to drive the predetermined substance to flow along the conveying channel, a flexible sheet provided on the rack and located on an ejection path of an outlet of the conveying channel, and a light source assembly provided in the accommodating chamber and configured to project a preset light beam upon the flexible sheet; before the predetermined substance is ejected to the flexible sheet, the flexible sheet is in a flat state; wherein the rack is a transparent partition, the partition separates the flexible sheet and the light source assembly in an up-and-down direction, and the partition is provided with an ejection port that communicates with the outlet of the conveying channel.

2. The flame simulation device according to claim 1, wherein one or more flexible sheets are provided.

3. The flame simulation device according to claim 1, wherein the flexible sheet is any one selected from the group consisting of a reflective film, a silicone sheet and a plastic sheet.

4. The flame simulation device according to claim 1, wherein the housing is made of a transparent material or a semi-transparent material.

5. The flame simulation device according to claim 1, wherein the predetermined substance is a liquid or a gas.

6. The flame simulation device according to claim 1, wherein the flexible sheet is located on an ejection path of the ejection port.

7. The flame simulation device according to claim 1, wherein the light source assembly comprises: a light body connected to the housing and illuminating the flexible sheet.

8. The flame simulation device according to claim 7, wherein the light source assembly further comprises: a lens, which focuses the light beam emitted by the light body on the flexible sheet.

9. The flame simulation device according to claim 7, wherein the light body emits the light beam to the flexible sheet from bottom to top or from top to bottom.

10. The flame simulation device according to claim 1, wherein a reflective cup is provided above the flexible sheet.

11. The flame simulation device according to claim 2, wherein the light source assembly comprises: a light body connected to the housing and illuminating the flexible sheet.

12. The flame simulation device according to claim 3, wherein the light source assembly comprises: a light body connected to the housing and illuminating the flexible sheet.

13. The flame simulation device according to claim 4, wherein the light source assembly comprises: a light body connected to the housing and illuminating the flexible sheet.

14. The flame simulation device according to claim 5, wherein the light source assembly comprises: a light body connected to the housing and illuminating the flexible sheet.

15. The flame simulation device according to claim 6, wherein the light source assembly comprises: a light body connected to the housing and illuminating the flexible sheet.

16. The flame simulation device according to claim 2, wherein a reflective cup is provided above the flexible sheet.

17. The flame simulation device according to claim 3, wherein a reflective cup is provided above the flexible sheet.

18. The flame simulation device according to claim 4, wherein a reflective cup is provided above the flexible sheet.

19. The flame simulation device according to claim 5, wherein a reflective cup is provided above the flexible sheet.

20. The flame simulation device according to claim 6, wherein a reflective cup is provided above the flexible sheet.

* * * * *